United States Patent

[11] 3,601,929

| [72] | Inventors | Herbert R. Uhtenwoldt<br>Worchester;<br>Frederick A. Hohler, Holden, both of, Mass. |
|---|---|---|
| [21] | Appl. No. | 879,038 |
| [22] | Filed | Nov. 24, 1969 |
| [45] | Patented | Aug. 31, 1971 |
| [73] | Assignee | The Heald Machine Company<br>Worchester, Mass. |

[54] GRINDING MACHINE
3 Claims, 5 Drawing Figs.

[52] U.S. Cl. .................................................. 54/165.9
[51] Int. Cl. ................................................... B24b 49/00
[50] Field of Search .......................................... 51/165 R,
165.77, 165.9, 165.91, 165.92, 165.93

[56] References Cited
UNITED STATES PATENTS

| 2,961,808 | 11/1960 | Dunigan ...................... | 51/165.92 |
| 3,417,512 | 12/1968 | Robillard et al. ............. | 51/165.91 |
| 3,534,509 | 10/1970 | Hatstat et al................. | 51/165 |

*Primary Examiner*—Lester M. Swingle
*Attorney*—Norman S. Blodgett

ABSTRACT: This invention relates to a grinding machine and, more particularly, to apparatus for finishing a surface of revolution by the abrasive process, including means for maintaining the quality of the finished surface despite changes in abrasive wheel diameter.

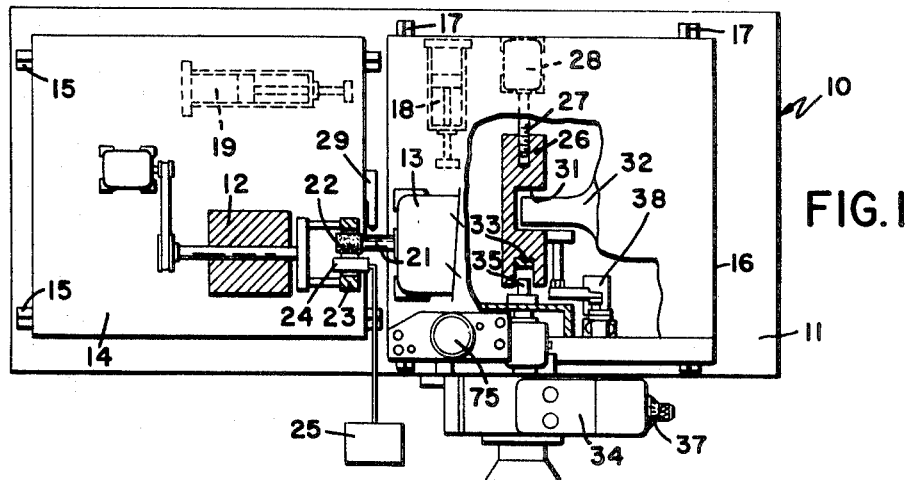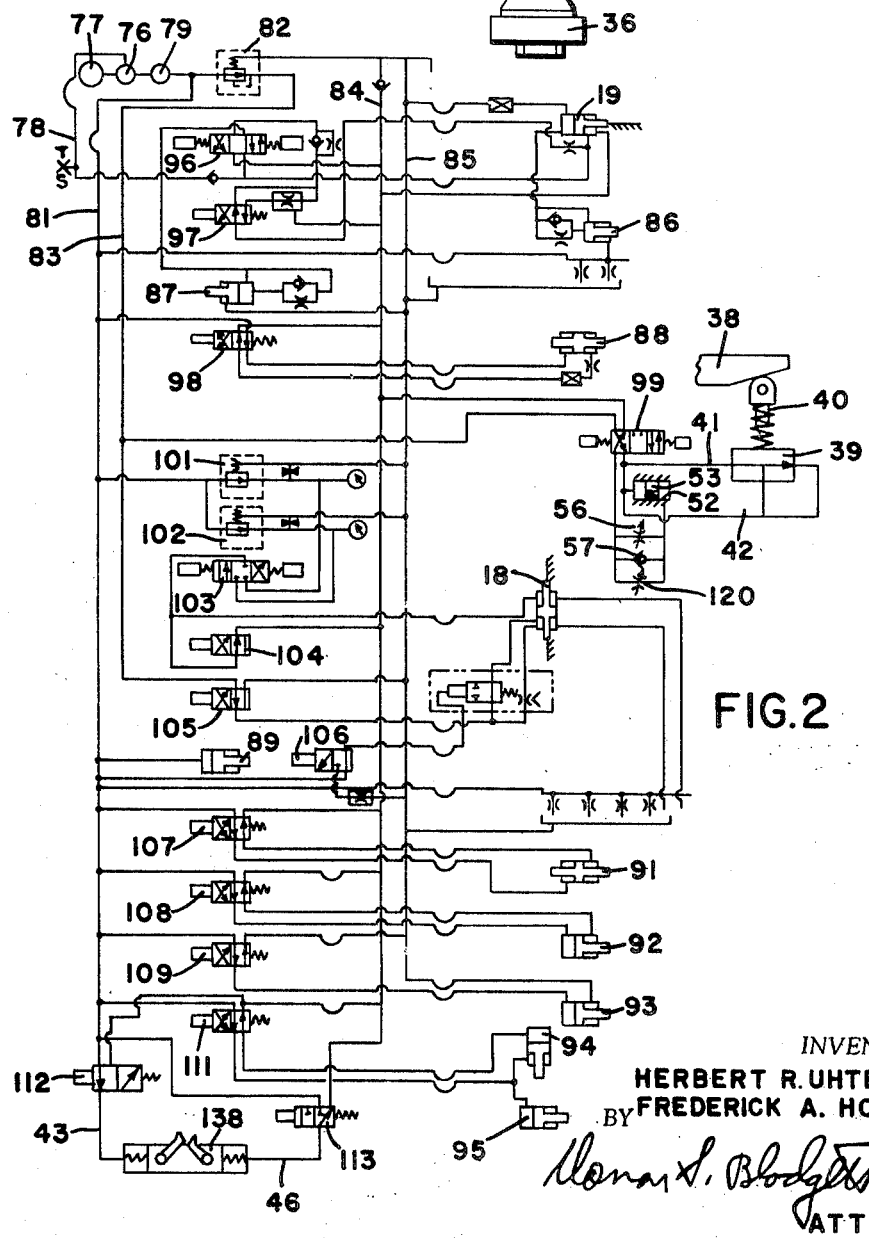

GRINDING MACHINE

BACKGROUND OF THE INVENTION

In the operation of grinding machines, it has been suggested that the grinding cycle consist of a "controlled force" grinding process wherein the force is limited at certain parts of the cycle by a feed rate mechanism. Such a machine is shown in U.S. Pat. No. 3,534,509 dated Oct. 30, 1970. In this patent is described the use of hydraulically operated pawls constituting a feedback mechanism and it also describes a feed rate retraction stop. After the roughing portion of the cycle has been completed, the retraction stop contacts a compensation slide contact button; a piston rotates a lever to turn an inner screw member which retracts the stop and allows the wheelhead slide to move further transversely of the workpiece axis. The rate of this motion is controlled by metering the oil on one side of the piston through a throttle. This arrangement has proven very useful to obtain better size, geometry, and parts straightness. Also, the surface finish maintained is better than obtained when using an unrestricted low force for finish grinding. The retraction stop only limits the velocity of the controlled force slide.

The force exerted on the wheel cannot exceed the force which has been preset on the pressure regulators associated with the main controlled force cylinder. However, if the wheel attempts to grind faster than the preset velocity on the retraction stop, the force of the wheel against the workpiece is reduced by the amount of force exerted against the retraction stop. This acts as a regulating mechanism and serves to modulate the force between the workpiece and the grinding wheel, depending on the random variation of grindability of the work and the sharpness of the grinding wheel. This means that, if the wheel cuts freely rather than going through the stock at a very high rate thus causing high microfinish, out-of-roundness (because of the depth of cut), and bore oversize (because of gage and machine retraction time), the force will be dissipated on the retraction stop, thus reducing the force of the wheel against the work. This reduces the cutting rate of the grinding wheel and regulates the force to hold the finish velocity within acceptable limits to maintain constant microfinish, size, and geometry.

Besides these random effects of variation of grinding wheel sharpness, work grindability, dulling of the wheel, etc. there is a proportional effect caused by the size of the grinding wheel. It is a well-known fact that a small wheel, say 70 percent of bore diameter, grinds faster with a given amount of force than a larger wheel, say, 80 percent of bore diameter. Even with the regulating quality of the retraction stop, there is a marked increase in finish velocity when the wheel is worn. When a low micro is required with little variation, it is necessary to hold the finish velocity and thus the finishing time within close limits. These and other difficulties experienced with the prior art devices have been obviated in a novel manner by the present invention.

It is, therefore, an outstanding object of the invention to provide a grinding machine in which size, geometry, and finish of work surface are maintained at a constant value despite changes in size of the abrasive wheel.

Another object of this invention is the provision of an internal grinding machine in which reduction in abrasive wheel diameter does not affect the quality of the finished surface.

A further object of the present invention is the provision of an internal grinding machine having means for changing the force of the abrasive wheel against the workpiece during the finishing portion of the cycle, which compensation takes place automatically and without the necessity of attention on the part of the machine operator.

With these and other objects in view, as will be apparent to those skilled in the art, the invention resides in the combination of parts set forth in the specification and covered by the claims appended hereto.

SUMMARY OF THE INVENTION

In general, the invention consists of a grinding machine having a base, having a workhead mounted on the base adapted to support and rotate a workpiece, and having a wheelhead mounted on the base and having a rotatable abrasive wheel. An actuator is provided for bringing about relative movement between the workhead and the wheelhead to bring about grinding engagement between the wheel and the workpiece, the force available from the actuator being at a predetermined value when the abrasive wheel is new. Means is provided to reduce the said force as the wheel diameter is reduced.

More specifically, the force is reduced in a predetermined manner as the distance between the wheelhead and the workhead is successively reduced during the grinding of a succession of workpieces. The actuator is a hydraulic linear actuator; the said means consists of a throttle connected hydraulically across the actuator and mechanically on the base, and a cam is operated by the relative movement of the wheelhead and the workhead to set the throttle at successive amounts of restriction to hydraulic flow therethrough.

BRIEF DESCRIPTION OF THE DRAWINGS

The character of the invention, however, may be best understood by reference to one of its structural forms, as illustrated by the accompanying drawings, in which:

FIG. 1 is a somewhat schematic plan view of a grinding machine embodying the principles of the present invention, FIG. 2 is a hydraulic schematic diagram of the machine.

DESCRIPTION OF THE PREFERRED EMBODIMENT

Figure 4:
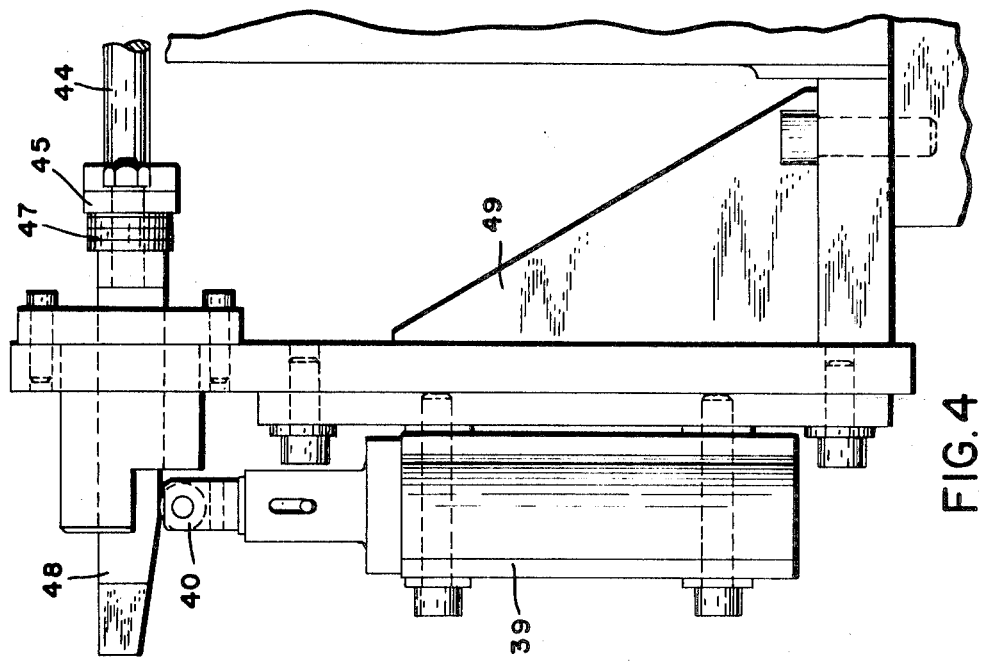
FIG. 4 is an elevational view of the apparatus shown in FIG. 3.

Referring first to FIG. 1, wherein are best shown the general features of the invention, the grinding machine, indicated generally by the reference numeral 10, is shown as consisting of a base 11 having a flat, horizontal upper surface on which are mounted a workhead 12 and a wheelhead 13. The workhead is carried on a workhead table 14 which is mounted for longitudinal motion on the base 11 by means of ways 15. Similarly, the wheelhead 13 is carried on a wheelhead table 16 which is mounted for transverse sliding motion on the base 11 by means of ways 17. Extending between the wheelhead table 16 and the base 11 is a feed cylinder 18 which is suitably provided with fluid pressure to bring about movement of the table 16 transversely of the base. Similarly, a hydraulic cylinder 19 connects the table 14 to the base 11 and brings about longitudinal movement of the table 14 over the ways 15.

Extending from the wheelhead 13 is a rotatable spindle 21 carrying on its outer end an abrasive wheel 22. Carried by the workhead 12 and rotated thereby is a workpiece 23; for the purpose of illustration, this workpiece is shown as the race of a ball bearing. The inner bore is being ground by the abrasive wheel 22 and the workpiece is supported on its outer cylindrical surface by shoes in the conventional manner. Residing in the bore of the workpiece during the grinding operation is a pneumatic air gage 24 of the well-known type, which gage is connected to a control box 25. The control box provides a flow of air to the gage in the well-known manner, the amount of air that is able to pass between the surface of the gage and the surface of the bore of the workpiece being an indication of the workpiece size. This flow is transmitted to the control box 25, which contains various pressure switches to operate electrically to open and close solenoid valves in the hydraulic circuitry of the machine.

Slidable on the upper surface of the base 11 is a compensation slide or block 26 which, at its rearward end, is threadedly attached to a threaded shaft 27 which, in turn, is driven by a motor 28 fastened to the base 11. This motor is of the type capable of small discreet rotary increments in response to pulses received from an electrical control. By regulating the nature and number of the pulses from the electrical control it is possible to rotate the motor quickly or slowly in either direction in exact amounts to make the block 26 move transversely over the surface of the base 11. In the present apparatus, this motor is used to produce compensation after a dressing operation and to provide for the retraction of the wheel at a suitable time during the grinding cycle, as is well known. A dressing diamond 29 is mounted on the workhead table 14 in position to engage the wheel 22 during a dressing traverse at a suitable time in the grinding cycle.

The block 26 is provided with a transverse slot 31 and in this slot resides a horn 32 extending downwardly from the undersurface of the wheelhead table 16. The front of the block 26 is provided with a hardened metal insert 33. Mounted on the front portion of the wheelhead table 16 is a retractable stop 34 having a contact rod 35 extending toward the block 26 and toward the metal insert 33. Mounted at the front of the retractable stop is a gear 36 and at the right an adjusting knob 37.

Figure 5:
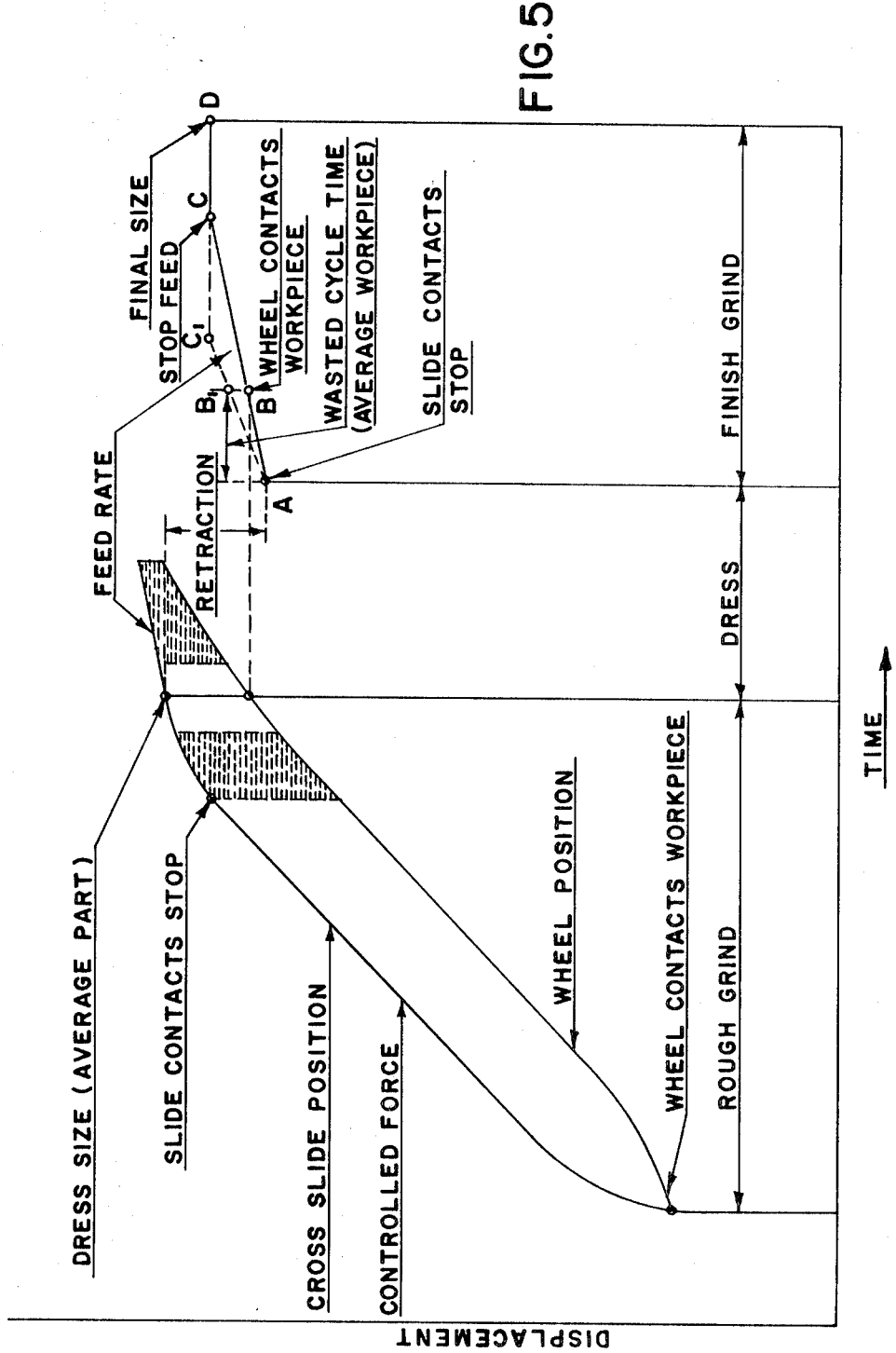
FIG. 5 is a cycle diagram of the grinding machine during its operation.

The gear 36 is attached to the outboard end of the rod 35 and the gear is contacted by a feedback mechanism (see FIG. 5). A hydraulic cylinder on the interior of the adjustable stop 34 operates on a lever arm to advance and retract the rod 35 on occasion. The rotation of this lever arm and the advancement of the rod is also determined by the positioning of a vertical stop shaft having at its upper end a knob 75 permitting adjustment. Mounted on the compensation slide or block 26 is a regulating mechanism 38, which will be described more fully hereinafter.

Referring now to FIG. 2, which shows the hydraulic circuitry in the machine, the oil is provided by a pump 76 driven by a motor 77. The pump is connected to a line 78 adapted to carry, in the preferred embodiment, 500 p.s.i. unfiltered oil. The pump is also connected through a filter 79 to a line 81 adapted to carry 500 p.s.i. filtered oil. The pump is also connected through a pressure regulating valve 82 which provides filtered oil at 125 p.s.i. to a line 83. Extending through the circuitry is a 5 p.s.i. drain line 84 and a main drain line 85. The pressure lines 78, 81, and 83 operate with the drain lines 84 and 85 to regulate various cylinders in the machine, including the WORKHEAD TABLE cylinder 19, which has been described in connection with FIG. 1. Also included in the circuitry is a TABLE IN dashpot 86, a TABLE OUT dashpot 87, a LOADING cylinder 88, the FEED cylinder 18 (which has also been described in connection with FIG. 1), a RETRACTABLE STOP PRELOAD cylinder 89, a WHEELHEAD SWIVEL cylinder 91, a GAGE IN cylinder 92, another GAGE IN cylinder 93, and DIAMOND TURNER cylinders 94 and 95. Regulating the flow of pressure fluid from the pressure lines 78, 81, and 83 to these cylinders and to the drain lines 84 and 85 are the following solenoid valves: TABLE INDEX valve 96, a SPEED valve 97, a LOAD valve 98, a FEED-AND-RETRACT valve 99, a pressure regulating valve 101 for producing low-pressure fluid, a pressure regulating valve 102 for producing high-pressure fluid, a HIGH-LOW FORCE cross-slide valve 103, a CROSS-SLIDE FEED valve 104, and a BACKOFF valve 105. Also included is a DAMPER BYPASS valve 106, a WHEELHEAD SWIVEL valve 107, the SINGLE JET GAGE valve 108, a DIAMOND TURNER valve 111, a DOUBLE JET GAGE valve 109, a FEEDBACK valve 112, and another FEEDBACK valve 113. It can be seen that the valves 112 and 113 are connected to conduits 43 and 46 leading to a feedback mechanism 138 associated with the gear 36 mounted on the stop 34.

Formed in the retractable stop 34 is a cylinder consisting of a bore 52 which carries a piston 53. The ends of the cylinder are connected to the FEED-AND-RETRACT valve 99 for the alternate introduction of pressure fluid to the ends of the piston. One end of the cylinder is connected to the valve through a throttle 56, a check valve 57, and a throttle 120. Associated with the other end of the cylinder is a pressure regulating valve 39 having an actuating stem 40. The input side of the valve is connected by a conduit 41 to the valve 99, while the output side of the valve is connected by a conduit 42 to the end of the cylinder. Associated with the stem 40 is the compensation mechanism 38. The pressure regulating valve is arranged so that, as the stem 40 rises, less pressure appears at the piston 53.

Figure 3:
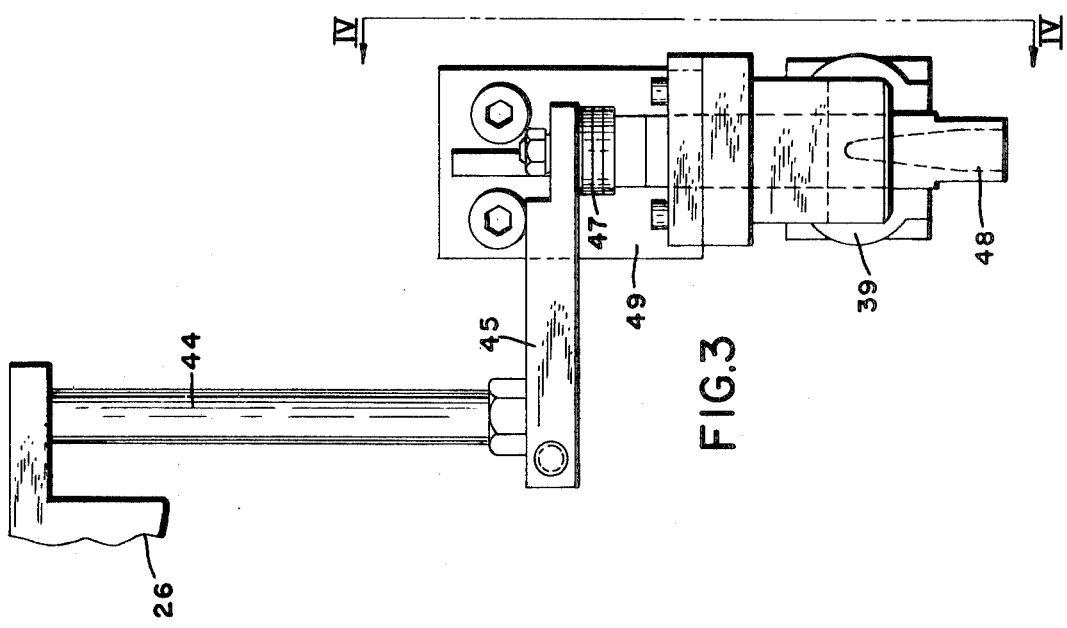
FIG. 3 is a plan view of certain regulating apparatus forming part of the invention.

In FIGS. 3 and 4, it can be seen that a shaft 44 is connected to the compensation slide or block 26, extends forwardly of the machine, and is attached to a plate 45. This plate is connected through washers 47 to a cam 48. This cam is slidably carried in a bracket 49 which is mounted on the base 11. The cam 48 engages the stem 40 of the pressure regulating valve 39, which stem has a roller at its upper end to give smooth action.

In order to compensate for the proportional effect caused by the variation of size of the grinding wheel, the pressure regulator valve 39 is operative between the directional valve 99 and the feed piston bore 52. By changing this pressure on the piston 53, in accordance with the motion of the compensating block 26 (which is a function of the wheel diameter), the pressure drop over the throttle 56 is also changed. This changes the rate with which the retraction stop rod 35 retracts. This rate-modulating apparatus maintains a constant finish time for the workpiece which is independent of wheel diameter.

There are several reasons why the finish rate tends to increase with decreasing wheel diameter. One reason is that the "remnant" deflection of the spindle, which exists because of the previous roughing cycle, brings about this action. This spindle deflection produces a wheel force against the work. A smaller wheel will cut at a faster rate with a given force. The cycle diagram shown in FIG. 5 shows the way in which this operates in connection with a standard grinding cycle. During the last part of the grinding cycle, the solid line A–B–C–D represents the operation of the machine with a large wheel, such as would be encountered if the abrasive wheel were new. The dotted line A–B'–C'–D shows the sort of pattern that occurs with the present machine when the wheel is quite old and has a small diameter. In both cases, the slide contacts the stop at the point A and, eventually, the wheel contacts the workpiece at point B. The point B' is displaced from the point B because, of course, the wheel diameter is smaller. Not only that, but because of the wheel diameter being smaller, the wheel grinds faster and the point C' is reached at a point in time long before the point C is reached with the large wheel. The displacement is the same for both point C and C' because this is a gage-type of control. The final size D is reached in both cases in the same length of time, but the present machine allows the smaller wheel to take a longer time to accomplish this, and this means that the surface finish of the workpiece, the size, and the geometry will be the same as with the larger wheel. It can be seen, therefore, that, by use of the present invention, it is possible to keep the three factors of size, geometry, and surface finish at the same value, irrespective of the size of the wheel.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine, comprising
 a. a base,
 b. a workhead mounted on the base adapted to support and rotate a workpiece,
 c. a wheelhead mounted on the base and having a rotatable abrasive wheel,
 d. an actuator for bringing about relative movement between the workhead and the wheelhead to bring about grinding engagement between the wheel and the workpiece, the force available from the actuator being at a predetermined value when the abrasive wheel is new, and
e. means to reduce the said force as the wheel diameter is reduced.

2. A grinding machine as recited in claim 1, wherein the force is reduced in a predetermined manner as the distance between the wheelhead and the workhead is successively reduced during the grinding of a succession of workpieces.

3. A grinding machine as recited in claim 1, wherein the actuator is a hydraulic linear actuator wherein the said means consists of a throttle connected hydraulically across the actuator and mechanically on the base, and wherein a cam is operated by the relative movement of the wheelhead and workhead to set the throttle at successive amounts of restriction to hydraulic flow therethrough.